Aug. 29, 1972    M. C. WHEELER    3,687,789
HEAT-SEALING APPARATUS
Filed April 8, 1970    3 Sheets-Sheet 2

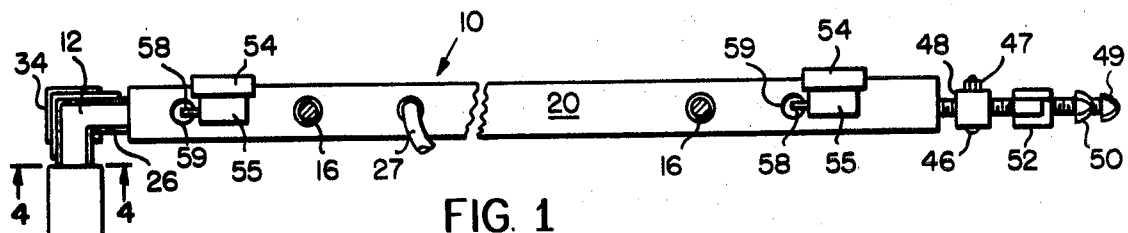
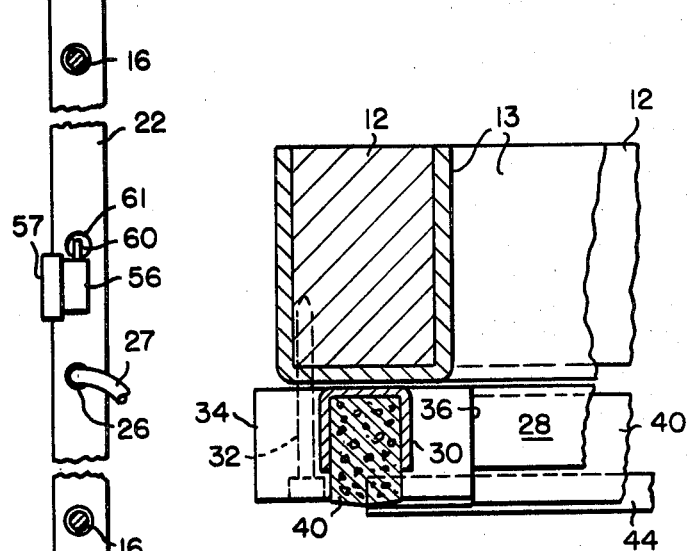
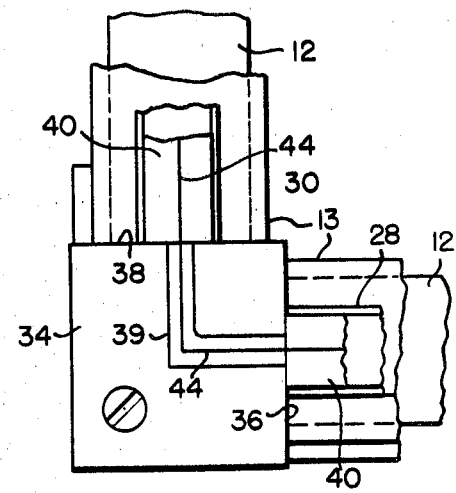
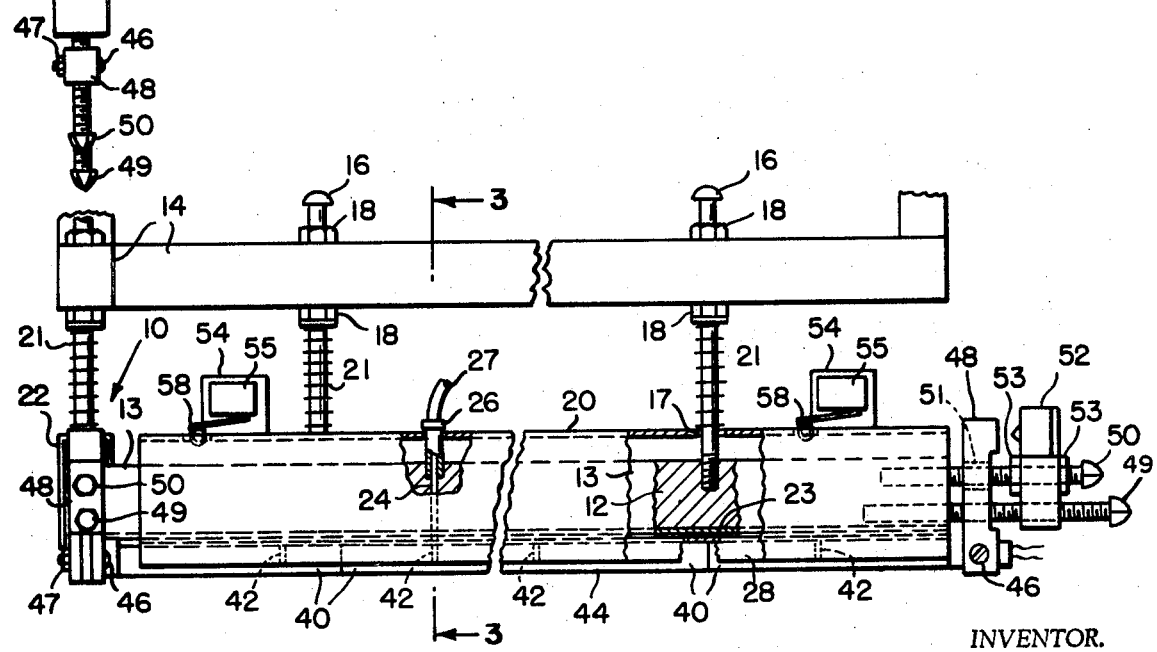

INVENTOR.
MERVIL C. WHEELER
BY
Shlesinger, Fitzsimmons & Shlesinger
ATTORNEYS

United States Patent Office 3,687,789
Patented Aug. 29, 1972

---

3,687,789
HEAT-SEALING APPARATUS
Mervil C. Wheeler, Bethpage, N.Y., assignor to The Trescott Company, Division of Telesonic Packaging Corporation, Long Island City, N.Y.
Continuation-in-part of application Ser. No. 656,082, July 26, 1967. This application Apr. 8, 1970, Ser. No. 26,617
Int. Cl. B32b 31/18, 31/20
U.S. Cl. 156—515                                    11 Claims

ABSTRACT OF THE DISCLOSURE

This apparatus for heat-sealing and cutting plastic wrapping film comprises a movable, L-shaped upper jaw containing a plurality of lava stone blocks having lower faces, which are V-shaped in cross section. Embedded in and projecting from registering slots formed in the undersides of the blocks at their vertices is a thin metal ribbon. A thermocouple embedded in one block controls a circuit which supplies a first or preheat voltage to the ribbon to heat the surrounding blocks, so that when the upper jaw is lowered against layers of film superposed on the lower jaw, its heated undersurfaces seal the layers together without distorting the film. Then an impulse of higher voltage is applied to the ribbon to sever the film. A lubricant is fed to the ribbon, and "Teflon" is used on the lower jaw to prevent fused film from adhering to these parts.

---

This application is a continuation-in-part of my pending application Ser. No. 656,082, filed July 26, 1967, now abandoned.

This invention relates to heat sealing apparatus, and more particularly to apparatus for heat-sealing heat-shrinkable wrapping film about an article. More particularly, this invention relates to improved means for severing and sealing film wrapping material, such as is used for wrapping produce, candy, meats, phonograph records, etc.

Customarily the package or article, which is to be wrapped, is moved against the film sheet to draw the film around the package or article and to pass the film over a stationary jaw. Then a movable upper jaw, which is in registry with the stationary jaw, is brought down onto the film to sever the film and to seal it about the article. The package is then passed through a shrink tunnel where heat shrinks the film snugly about the package.

Heretofore, a more or less general practice has been to mount an electrical conductor, such as a round wire, on one jaw to extend around the jaw in position to confront a resilient or grooved working surface of the other jaw, when the movable jaw is in operating position. The wire is connected in a circuit which energizes the wire, and causes it to become extremely hot, when the jaws are pressed together, so that the superposed portions of the film between the jaws are simultaneously severed and sealed by the hot wire in a single operation.

A major disadvantage of this prior construction is that the wire itself has been employed both to sever and to seam the superposed portions of film. Consequently the resulting seams are extremely narrow. Moreover, the plastic wrapping film, when pressed between the heated wire and the working surface of the other jaw, tends to become deoriented and weakened along opposite sides of the hot wire, that is, in the areas of the seams. This often leads to undesirable ripping or stretching of the wrapping material.

A still further disadvantage is that the surfaces of the jaws tend to become quite hot in the area of the electrical wire, and as a consequence the plastic wrapping material often melts and adheres to the jaw so that in time it becomes necessary to clean the jaws. Another drawback of prior constructions is that one of the most common plastic films used with this type of apparatus is made from polyvinyl chloride, and such films, when fused or melted, produce chlorine gas and/or hydrochloric acid. These substances not only discolor the hands and nails but may be harmful to the machine operator over a period of extended exposure. In fact, the danger is so great that in some plants it is the practice to rotate operators to avoid long periods of exposure to the gases.

It is an object of this invention to provide improved heat-sealing means for the purpose described, which will form a much stronger seam than heretofore.

Another object of this invention is to provide for apparatus of the type described improved jaws for pressing and sealing heat shrinkable wrapping film around an article.

Another object of this invention is to prevent heat-shrinkable wrapping material from becoming deoriented and weakened in the immediate vicinity of its seams. To this end it is an object of this invention to provide separate means for sealing and severing, respectively, the superposed portions of wrapping film employed with apparatus of the type described.

A still further object of this invention is to provide apparatus of the type described, in which need for cleaning its film sealing and severing elements will be minimized.

It is also an object of this invention to provide apparatus of the type described which is substantially safer to operate than prior apparatus.

Other objects and advantages of the invention will be apparent hereinafter from the specification and from the recital of the appended claims, particularly when read in conjunction with the accompanying drawings.

In the drawings:

FIG. 1 is a fragmentary plan view of a heat-sealing and severing jaw, made in accordance with one embodiment of this invention for a thermoplastic film wrapping machine;

FIG. 2 is a fragmentary side elevational view of this jaw and of a mounting bracket therefor, parts of the jaw being broken away and shown in section for purposes of illustration;

FIG. 4 is an enlarged, fragmentary sectional view taken along the line 4—4 in FIG. 1 looking in the direction of the arrows;

FIG. 5 is a bottom view of that portion of the jaw illustrated in FIG. 4;

Figure 3:
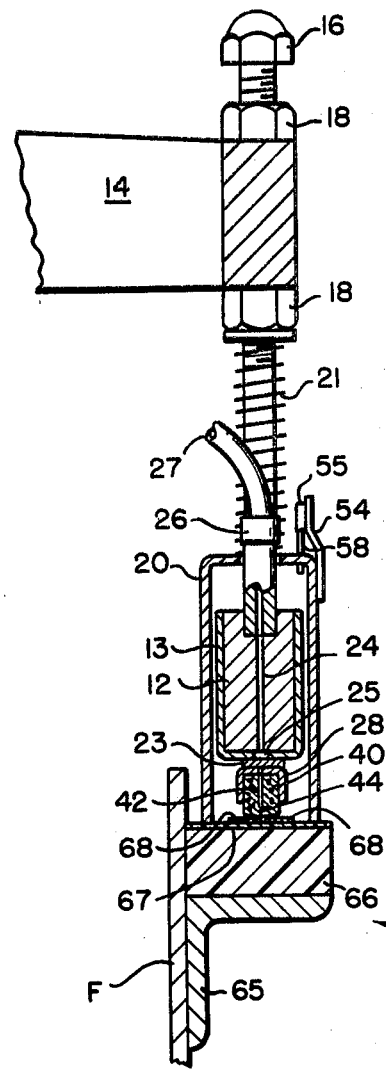
FIG. 3 is an enlarged, fragmentary sectional view taken along the line 3—3 in FIG. 2 looking in the direction of the arrows, and showing part of a second, stationary jaw with which this novel sealing and severing jaw is adapted to cooperate.

Referring now to the drawings by numerals of reference, 10 denotes generally the movable jaw of a heat-sealing and severing machine. It comprises two bars 12, which are secured at right angles to one another in the legs of a right angular, channel-shaped member 13. The bars 12 and member 13 are supported by a plurality of bolts 16 beneath a conventional jaw-mounting bracket 14 (FIGS. 2 and 3), which may be mounted in known manner for vertical movement on the wrapping machine. Each of the bolts 16, four of which are employed in the illustrated embodiment, is secured at its upper end to the bracket 14 by nuts 18, which thread onto the bolt against the upper and lower surfaces, respectively, of the bracket. These bolts 16 pass slidably through spaced openings 17 (FIG. 2) formed in the tops of elongate, inverted, channel-shaped members 20 and 22, which overlie the members 12 and 13; and the bolts are threaded or otherwise secured at their lower ends in the bars 12. Surrounding each bolt 16 between the lower of its adjusting nuts 18, and the upper surface of the associated channel member 20 or 22, is a coiled spring 21.

Secured to the underside of each of the two legs of the member 13 is an elongate felt strip 23. Intermediate its ends each bar 12 has therethrough a vertical hole 24 (FIGS. 2 and 3), which communicates at its lower end with the associated strip 23 through a registering opening 25 in member 13. The upper end of each hole 24 is connected by a nipple 26 and tubing 27 to a supply of lubricant for a purpose noted below.

Fastened to the bottom of member 13 over the strips 23, and disposed between the sides of the members 20 and 22, respectively, are two inverted, channel-shaped members 28 and 30, respectively (FIGS. 4 and 5). Members 28 and 30 extend along the underside of member 13 from the outer or remote ends thereof toward, but just short of, the intersection of its two legs, as shown more clearly in FIG. 5. Also secured by a bolt 32 to the bottom of member 13 at the intersection of its two legs is a square corner block 34 (FIGS. 1, 4 and 5), whose intersecting side edges 36 and 38 abut the inner ends of the members 28 and 30, respectively. In its underside block 34 has a right angular slot 39 (FIG. 5).

Figure 6:
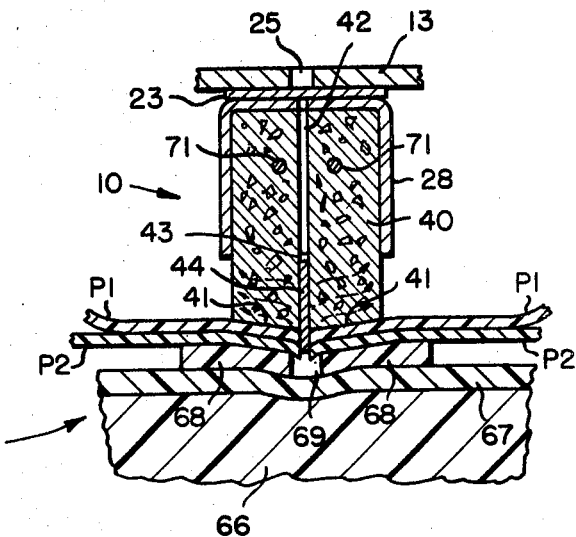
FIG. 6 is a greatly enlarged fragmentary sectional view, showing the upper jaw in its down position with the film sheets gripped between confronting portions of the upper and lower jaws and with the ribbon severing the film sheets.

Secured in each of the members 28 and 30, and extending downwardly below the lower edges of these members, are a plurality of identical, aligned blocks 40 of a very hard, igneous material, such as lava stone, the lower surfaces of which are chamfered as at 41 (FIG. 6). The blocks 40 are arranged in L-shaped formation to conform to the shape of member 13. Blocks 40 have therein a plurality of vertical bores 42, which open at their upper ends on the belt strips 23, and at their lower ends on slots 43 (FIG. 6), which are milled in the undersides of the blocks medially thereof.

Embedded in slots 43 and 39 is an electrically-conductive heating element or ribbon 44. This element may be made from a nickel-chrome alloy, and projects for its entire length slightly below the registering lower surfaces of the blocks 40. It is extremely thin—approximately 0.0089" thick—so that its projecting lower edge is nearly knife-sharp.

Opposite ends of element 44 are secured by screws 46 and nuts 47 (FIGS. 1 and 2) to the lower ends of brackets 48, which are adjustably fastened by bolts 49 to the distal ends of the members 12. Each bolt 49 threads through its associated bracket 48 and into one of the members 12, so that by relative adjustment between a bolt 49 and its associated bracket 48, the bracket may be shifted toward and away from the adjacent member 12 thereby to increase or decrease the tension in the element 44.

Another bolt 50 passes through an enlarged opening 51 formed in each bracket 48 adjacent the upper end thereof, and threads into the adjacent member 12 above and parallel to the adjacent bolt 49. A limit switch 52 is adjustably mounted by nuts 53 upon the bolts 49 and 50 at one end of the arm 10 (FIGS. 1 and 2) for selectively supplying a pulse of severing voltage to ribbon element 44 as described below.

Secured to the upper ends of a pair of spaced brackets 54, which are mounted on the upper side of member 20, are two further limit switches 55. A still further limit switch 56 is secured to the upper end of a bracket 57, which is secured to and projects above member 22. Each of the actuating arms 58 of the switches 55 overlies an opening 59 in the top of member 20; and the actuating arm 60 of switch 56 overlies a like opening 61 formed in the top of member 22. Normally the springs 21 urge the members 20 and 22 to their lowermost positions relative to the bolts 16, wherein the actuating arms 58 and 60 of the switches 55 and 56 engage the upper surface of members 12, and the switches 55 and 56 are in their closed positions. At this time the lower edges of members 20 and 22 project below the heating element 44 to protect it.

A stationary lower jaw 64 (FIGS. 3 and 6) which has an L-shaped configuration similar to that of the upper jaw 10 is fixed to a stationary bracket 65 carried by the frame F of the wrapping machine. The lower jaw comprises an elongate, resilient, right angular member 66 made of silicone rubber, or the like, which is rectangular in cross section. Secured on the upper surface of lower jaw 66 is a thin layer of "Teflon" (polytetrafluoroethylene) cloth 67. Secured on top of pad 67 on each leg of the lower jaw 64 are two, closely-spaced, parallel strips 68 (FIG. 6) of plastic, also preferably made of "Teflon." These strips 68 are spaced apart so that the ribbon 44 can go between these strips when the upper jaw is in its down position as shown in FIG. 6.

Figure 7:
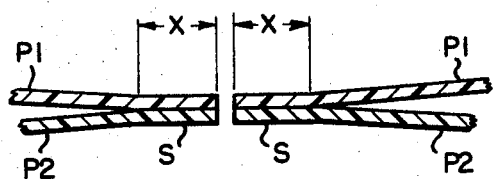
FIG. 7 is an enlarged fragmentary sectional view illustrating schematically the type of seams that are formed adjacent the severed edges of the superposed portions of film.

As the upper jaw 10 descends it clamps the film sheets $P_1$ and $P_2$, which have been wrapped around the article that is to be packaged, between it and the lower jaw 64 and heats these sheets where they are in contact with the upper jaw. Then ribbon 44 is instantaneously given a high impulse voltage to sever the sheets leaving sealed areas at both sides of the cut as shown in FIGS. 6 and 7. Then the upper jaw is raised and the operation is complete.

Figure 8:
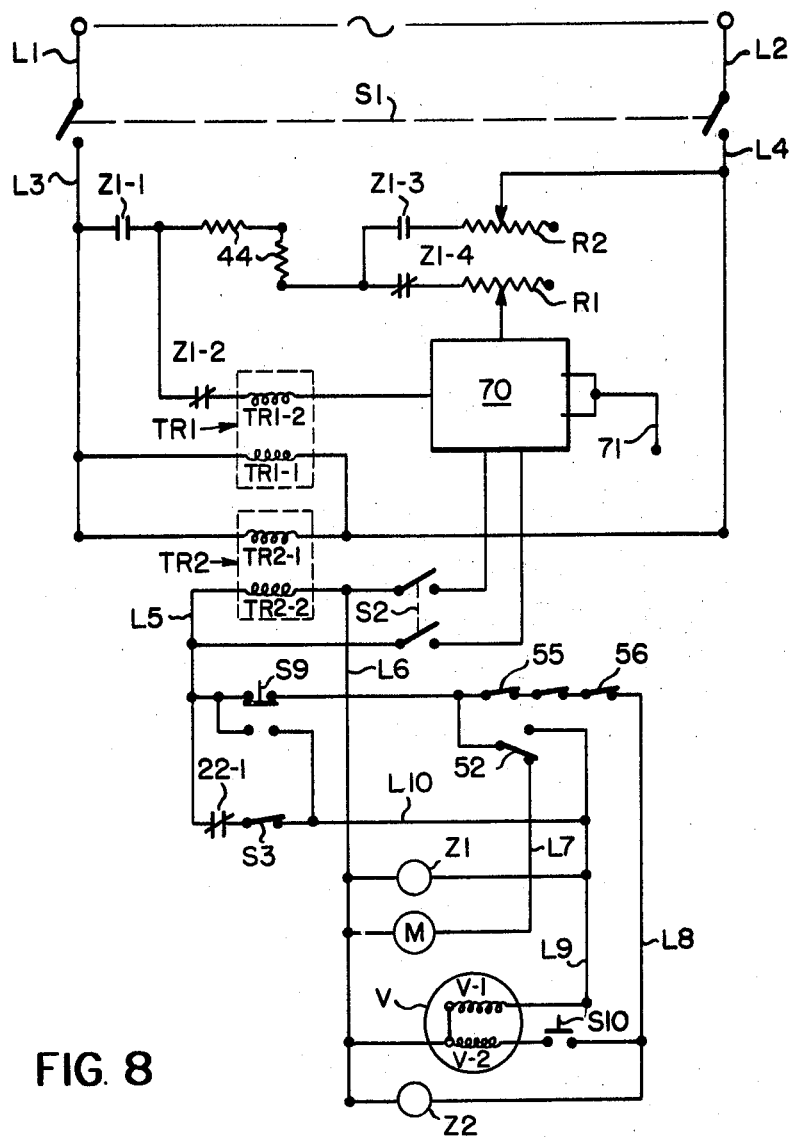
FIG. 8 is a wiring diagram illustrating one manner in which the machine employing these jaws may be made to operate.

Referring now to FIG. 8, M denotes an electric motor, which may be employed to operate for example, a conventional hydroulic or pneumatic system for driving the movable upper jaw 10 downwardly into operative engagement with the lower jaw 64. This system may include a conventional valve V operable in one direction by a solenoid coil V-2 to shift valve V to a position in which the motive fluid moves upper jaw 10 to operative position against the resistance of a spring (not illustrated), and operable by a solenoid coil V-1 to permit spring-return movement of jaw 10 to its upper or inoperative position. A conventional pyrometer 70 is connected to the leads 71 of a thermocouple, which is embedded in one of the stone blocks 40 to control the temperature of the blocks 40.

An alternating current (AC) power supply from lines L1 and L2 is adapted to be supplied through a manually-operable ON-OFF switch S1 to lines L3 and L4. The ribbon 44 is connected between lines L3, L4 to be energized, selectively, with a low heating voltage, or a high heat impulse voltage, depending upon the disposition of relay switches Z1-1 through Z1-4. Normally a low heating voltage is applied to ribbon 44, thereby to transmit heat to the surrounding stone blocks 40 as indicated by the broken lines and arrows in FIG. 6. However, when the blocks reach a predetermined temperature, the thermocouple 71 causes the controller 70 to interrupt the low heating voltage. It is turned on again when the temperature falls below a predetermined cycle.

When the switch S1 is closed, lines L3 and L4 supply power to the primary windings TR1-1 and TR2-1 of two transformers TR1 and TR2. Secondary winding TR2-2 of transformer TR2 now energizes lines L5 and L6. Assuming jaw 10 is in its upper or inoperative position, motor M may be energized by a circuit through line L5, a pushbutton STOP switch S9, the impulse limit switch 52, line L7, motor M, and line L6. Also, relay Z2 is energized through line L6, the coil of relay Z2, line L8, the now-closed switches 55 and 56, switch S9 and line L5, thereby opening its normally-closed switch Z2-1, which is in series with a bypass safety switch S3. Switch S3 is held open by the jaw 10 when the latter is in its upper position, so the opening of Z2-1 has no effect at this time.

Before a sealing operation can take place, the manually-operable switch S2 must be closed to energize the controller 70 from the transformer coil TR2-2. Then, assuming the stone blocks 40 are at room temperature, the thermocouple 71 causes the controller 70 to connect the preheat rheostat R1 in circuit with transformer coil TR1-2, normally-closed relay switch Z1-2, the ribbon 44, and switch Z1-4. As long as the controller is energized, and the switches Z1-2 and Z1-4 are closed, the thermocouple 71 will cause low heating voltage to be applied to ribbon 44 in order to maintain the stone blocks 40 at a predetermined elevated temperature.

When the stone blocks have become heated, the jaw 10 can be actuated by pushing the START switch or pushbutton S10, thereby momentarily energizing the solenoid coil V-2 to shift valve V in a direction to cause the fluid control system to lower jaw 10. The valve remains in this position upon release of switch S10, and since the motor M is still energized, the jaw 10 is lowered until it is squeezed against jaw 64, at which time it operates the impulse limit switch 52, moving it from its normal position as shown in FIG. 8, to a second position in which it connects L5, through switch S9, to line L9. Line L9 now energizes the impulse relay Z1 and the solenoid coil V-1, which are connected in parallel between L9 and L6. The now-energized relay Z1 opens switches Z1-2 and Z1-4, and closes Z1-1 and Z1-3, thereby energizing ribbon 44 through the impulse rheostat R2 so that a high voltage is suddenly impressed across the ribbon, causing it suddenly to become extremely hot. At the same time, the now-energized coil V-1 shifts valve V to a position in which it interrupts the fluid drive to the jaw lowering mechanism, and allows the spring-loaded jaw 10 to commence to return to its uppermost or inoperative position. This movement permits switch 52 to return to its normal position (FIG. 8), thereby deenergizing relay coil V1 and relay Z1, so that the impulse voltage is removed from ribbon 44.

Each time the jaw reaches its lowered position, and at the time that it is momentarily subjected to its impulse voltage, the lower edge of the cutting ribbon 44 enters the space 69 between the Teflon strips 68. This permits the inclined lower surfaces 41 of the heated blocks 40 to press firmly against overlapping portions of the wrapping film sheets P1 and P2 to seal these portions along seams S (FIG. 7) at the same time that the impulse voltage causes the ribbon 44 to sever quickly and cleanly through the film between these seams. The result is that the width of the seal is as wide as the lava blocks, that is, the width (FIG. 7) of each seam is as wide as half the width of the blocks 40. Moreover, since the lava stone surfaces 41 are inclined upwardly away from the severing edge of element 44, and the wrapping film disposed therebeneath, the sections of the film immediately adjacent to the heating element 44 are not stressed, or heated excessively, or forced in directions away from opposite sides of the element 44. As a result the film sheets are not subjected to deorientation which would tend to weaken the film along the marginal edges of the seams. Moreover, the width of the seam formed in the superposed film layers will be controlled by the width and shape of the blocks 40, rather than by the cutting ribbon 44.

A further advantage of the instant invention is that the "Teflon" surface 67 and strips 68 will prevent the fused wrapping material from adhering to the stone blocks, the ribbon 44, or the top of the lower jaw 64. Furthermore, the laval stone sections 40, which are extremely hard and non-porous, may be scraped clean, if necessary, without serious wear.

The holes 42 in the blocks, provide ducts through which silicone oil can be supplied constantly to lubricate the heating ribbon 44 and also provide an additional release agent for the ribbon as the oil leaches to the sealing surface. This practically eliminates the necessity of cleaning the system, which is a most important item in automatic and semi-automatic sealing operations.

Switches 55 and 56, which are normally held closed, are positioned so that at least one will be opened if either of the ribbon shielding members 20 or 22 is accidentally forced upwardly against springs 21 during downward movement of the jaw 10 toward its operative position. For example, if an operator's hand, or the like were to be accidentally inserted between the jaws during downward movement of jaw 10, the hand or object would strike the lower edge of member 20 or 22 and cause it to be moved upwardly relative to the associated bar 12 far enough to open one of switches 55 and 56. This would deenergize relay Z2, thereby closing Z2-1 and energizing the UP solenoid coil V-1 through Z2-1, switch S3, lines L10 and L9, and coil V-1 to L6. The downward movement of jaw 10 would thus be interrupted.

Switches 55 and 56 are ineffective when jaw 10 is in its operative position, because at this time switch 52 is in circuit with line 9 so that switches 55 and 56 are bypassed.

A still further advantage of this apparatus is that, because the ribbon 44 is so thin, and because it enters the slots 69 between strips 68 during a cutting operation, where it is prevented by the surface 41 on the blocks 40 from coming into any unnecessary contact with the film that is to be cut, an absolute minimum of carbon or harmful gases (chlorine, e.g., in the case of polyvinyl chloride wrapping film) are given off during operation of the apparatus.

Although in the illustrated embodiment each leg of jaw 10 comprises a plurality of lava stone blocks 40, it will be understood that a single lava stone block may be secured in each of the members 28 and 30 in lieu of the multiple blocks.

Lava stone is preferred for holding the ribbon 44 because it is extremely hard, and has a smooth, non-porous surface, which will not wear. It is milled first to provide the slot for the ribbon 44 and then fired to say 1800° F.

Having thus described my invention, what I claim is:

1. Apparatus for heat sealing and cutting plastic wrapping film, comprising:
    a first jaw having a resilient operating surface,
    a second jaw having therein an elongate slot, and rigid sealing surfaces disposed at opposite sides of said slot,
    means for heating said rigid surfaces,
    means mounting one of said jaws for movement toward and away from the other jaw between operative and inoperative positions, respectively,
    said surfaces squeezing superposed layers of the wrapping film between them, when said one jaw is in operative position, thereby to cause the rigid, heated surfaces of said second jaw to fuse together said layers and form a seam approximately as wide as the overall width of both of said rigid surfaces, and
    an elongate, narrow cutting member mounted in said slot to project beyond said rigid sealing surfaces, and
    means for momentarily applying higher heat to said cutting member than to said sealing surfaces to cut through said superposed layers of film intermediate the longitudinal side edges of said seam when said one jaw is in operative position.

2. Apparatus as defined in claim 1, wherein:
    the operating surface of said first jaw has a groove therein aligned with said cutting member,
    said slot is disposed medially of the marginal side edges of said second jaw, and
    said rigid surfaces are inclined and converge forwardly from their outer edges toward said cutting blade.

3. Apparatus as defined in claim 2, wherein:
    said cutting member comprises a flat thin, electrically-conductive blade secured in and projecting from said slot, and said heating means comprises circuit means for connecting said blade to an electrical power supply to be heated thereby, said blade, when heated, being operative to heat said rigid operating surface by thermal conduction.

4. Apparatus as defined in claim 3, wherein said circuit means comprises:

a first circuit for selectively applying a first voltage to said blade, a second circuit for selectively supplying a second voltage to said blade, said second voltage being greater than said first voltage, means responsive to the temperature of said rigid surface to close said first circuit to apply said first voltage to said blade, when said temperature is below a predetermined value, and operative to open said first circuit, when said temperature exceeds said value, and means operative when said one jaw is moved to its operative position momentarily to close said second circuit thus momentarily to increase the temperature of said blade substantially above said predetermined value to effect the cutting of said superposed layers of film by said blade.

5. Apparatus as defined in claim 1, wherein: said second jaw comprises a stone block having said slot in one side thereof.

6. Apparatus as defined in claim 5, including:

an absorbent strip of material secured to the side of said block remote from said one side thereof, and means for supplying a lubricant to said strip, said block having therein a hole opening at one end on said strip and at its opposite end on said slot in said block to convey lubricant from said strip to said blade.

7. Apparatus as defined in claim 5, wherein said resilient surface includes a pair of strips secured on said resilient surface in spaced, parallel relation, and defining therebetween a narrow groove which registers with said blade to accommodate the portion thereof which projects from said block, when said one jaw is in its operative position.

8. Apparatus as defined in claim 5, wherein said heating means comprises:

a thermocouple embedded in said block, and means for connecting said blade to an electrical power supply, and responsive to said thermocouple to apply a first voltage to said blade to heat the latter, when the temperature of said block is below a predetermined value, and to remove said first voltage from said blade, when said temperature exceeds said value, said blade having a portion thereof in operative contact with said block along the entire length of said slot, thereby to transfer heat by conduction from said blade to said block.

9. Apparatus as defined in claim 8, including:

impulse means operable to apply to said blade a second voltage which is substantially greater than the first-named voltage, a switch operative in response to the movement of said one jaw to its operative position to actuate said impulse means momentarily.

10. Apparatus as defined in claim 1, wherein the means for heating said cutting member also heats said rigid sealing surfaces, and a control for said heating means is provided to effect momentary heating of the cutting member, when said jaws are in operative position, above the temperature employed for heating said sealing surfaces.

11. In a machine for heat-sealing thermoplastic wrapping film about an article, an upper movable jaw comprising a block of hard, non-porous material and an electrically heatable ribbon embedded in and protruding beyond the lower face of said block, a relatively stationary lower jaw, means for moving said upper jaw from an upper, inoperative position toward said lower jaw to clamp two layers of thermoplastic film between the lower jaw and said lower face of said block, means for supplying an electric current at relatively low voltage to said ribbon to heat said block by thermal conduction, to a temperature sufficient to fuse said layers of film where said block contacts such layers, and means for momentarily sending a pulse of higher voltage to said ribbon, when said upper jaw has clamped said layers on the lower jaw, to cause said ribbon to cut said layers along the line of said ribbon.

References Cited

UNITED STATES PATENTS

| | | | |
|---|---|---|---|
| 3,494,816 | 2/1970 | Fener | 156—359 |
| 3,273,307 | 9/1966 | Burt | 156—515 X |
| 2,961,031 | 11/1960 | Fener | 156—515 X |
| 3,348,520 | 10/1967 | Lockwood | 156—359 UX |
| 3,299,251 | 1/1967 | Zelnick | 156—389 |
| 3,310,449 | 3/1967 | Carter | 156—365 |

BENJAMIN A. BORCHELT, Primary Examiner

J. V. DORAMUS, Assistant Examiner

U.S. Cl. X.R.

156—359, 365, 583